(12) United States Patent
Valentinovich et al.

(10) Patent No.: US 7,513,926 B2
(45) Date of Patent: Apr. 7, 2009

(54) FILTER

(75) Inventors: Chekalov Lev Valentinovich, Yaroslavl (RU); Chekalov Vladimir Valentinovich, Yaroslavl (RU)

(73) Assignee: Condor-Ecology (RU)

( * ) Notice: Subject to any disclaimer, the term of this patent is extended or adjusted under 35 U.S.C. 154(b) by 266 days.

(21) Appl. No.: 11/483,440

(22) Filed: Jul. 10, 2006

(65) Prior Publication Data

US 2007/0028572 A1 Feb. 8, 2007

(51) Int. Cl.
*B01D 39/14* (2006.01)

(52) U.S. Cl. ............................ 55/522; 55/341.1; 55/529; 55/DIG. 12; 55/523; 55/381; 210/483

(58) Field of Classification Search ................... 55/482, 55/495, 500, 521, 522, 529, DIG. 12, 341.1, 55/523, 381; 210/483, 486, 496, 497.01
See application file for complete search history.

(56) References Cited

U.S. PATENT DOCUMENTS

| | | | | |
|---|---|---|---|---|
| 4,103,058 A | * | 7/1978 | Humlicek | 428/171 |
| 4,151,095 A | * | 4/1979 | Wright | 210/443 |
| 5,350,620 A | * | 9/1994 | Sundet et al. | 428/172 |
| 5,505,852 A | * | 4/1996 | van Rossen | 210/493.3 |
| 5,851,250 A | * | 12/1998 | Sugie et al. | 55/523 |
| 6,582,599 B2 | * | 6/2003 | Ito et al. | 210/416.1 |
| 6,743,270 B2 | * | 6/2004 | Oda et al. | 55/341.1 |
| 7,186,287 B2 | * | 3/2007 | Beier | 55/483 |

FOREIGN PATENT DOCUMENTS

EP 0 199528 A2 10/1986

OTHER PUBLICATIONS

Ekotechnika (cf. book Ekotekhnika, Izadatel'stvo "Rus", Iaroslavl, 2004, p. 137).

* cited by examiner

*Primary Examiner*—Duane S Smith
*Assistant Examiner*—Robert A Clemente
(74) *Attorney, Agent, or Firm*—RatnerPrestia

(57) ABSTRACT

A filter for the removal of dust from gases The filter comprises filter elements, on which a flat filter material assembled in superficial honeycombs is installed, which increases the filtration surface. The increased filtration area increases the output of the filter in proportion to the increase in the filtration area, which makes it possible to use a housing with smaller dimensions and to reduce the amount of metal needed for the filter.

3 Claims, 1 Drawing Sheet

FILTER

BACKGROUND OF THE INVENTION

The present invention pertains to the removal of dust from gases. Filters of the type of FRI, FKI, FRO, etc., are known (cf. book *Ekotekhnika,* Izdatel'stvo "Rus'", Iaroslavl, 2004, p. 137).

The dust is filtered in them through a flat filter material drawn over wire bodies. The filtration area determines the output of the filter and equals the area of the filter material drawn over the wire bodies. The larger the filtration area, the greater the number of filter elements, the larger the housing and the larger the dimensions and the weight of the filter.

To increase the output, a hard flat filter material is used, bulges are stamped out on it, thereby increasing the filtration area and the output of each filter element and, correspondingly, of the entire filter (EP 0199528 A2, published Oct. 29, 1986, priority Apr. 15, 1985 GB 8509618).

Drawback: The increase in the filtration area is limited by the stiffness of the material and by the necessity to preserve the bulges. In addition, such a stiff filter element must be removed and cleaned to remove the captured dust for regeneration, which limits the area of use of the apparatus. A thin layer is formed, which poorly absorbs harmful gaseous components in the gas to be purified.

SUMMARY OF THE INVENTION

Technical object of the invention according to the application—To increase the output of the filter, to reduce the amount of metal needed, to simplify operation, to increase the maximum output of the individual filter, and to create better conditions for the absorption of harmful gaseous components in the gas to be treated.

This technical result is accomplished by the filter containing a housing, a gas inlet, an outlet for the purified gas and the captured product, and filtering elements.

A flat filter material assembled in tetrangular superficial honeycombs is installed on the filter elements, and it is installed in the filter elements with the honeycomb walls facing the gas flow (outside the filter element in this case, FIG. 1). In addition, the ratio of the wall height to the distance between the parallel walls ranges from 1/1 to 1/10 at a wall height of up to 40 mm.

These features are essential and interrelated to one another with the formation of a stable combination of essential features, which is sufficient for achieving the required technical result.

BRIEF DESCRIPTION OF THE DRAWINGS

The possibility of embodying the invention characterized by the above-mentioned combination of features, as well as the possibility of accomplishing the object of the invention can be confirmed by the description of a possible construction of the device prepared in agreement with the present invention, whose essence is explained by the graphics, which show the following.

DETAILED DESCRIPTION OF THE INVENTION

The arrangement and the shape of the honeycombs are shown in view A. The filtration surface is shown in section B-B, and the enlargement of this surface is visible. The gas flow passes through the walls and the bottom of the honeycomb, and accumulation of captured product takes place on the entire surface. As the layer thickness increases, the layer separates from the wall of the honeycombs and is pressed against the bottom of the honeycomb by the gas flow. A thicker layer can be easily formed in the honeycomb, especially in case of friable materials (such as alumina), in order to more effectively absorb gaseous harmful substances, for example, fluorine compounds during the electrolysis of aluminum during filtration through it. Maximum absorption effect is selected for the absorption of harmful gaseous components from the gas to be purified by changing the composition of the dispersed phase at the gas inlet into the filter, whereas the thick layer in the honeycomb ensures good absorption of harmful gaseous components from the gas to be purified. The increased filtration area increases the output of the filter in proportion to the increase in the filtration area, which makes it possible to use a housing having smaller dimensions and to reduce the amount of metal needed for the filter.

To remove the captured product from the filter material, the purified gas is sent, for example, in the opposite direction. When the filter material is blown through with it in the opposite direction, the captured product is shaken off from the walls and from the bottom of the honeycombs and is removed via the captured product outlet, FIG. 1. It is possible to introduce compressed air pulses into the filter elements from a special device (not shown in FIG. 1). The filter material installed on the filter elements (FIG. 1) is shaken by this pulse and is freed of the layer of captured product, which falls down, and it will also be removed via the captured product outlet.

The filter elements are changed very rarely, only in case of wear and rupture of the filter material, and it is therefore simpler to operate the filter.

A twofold or greater increase in the filtration area and consequently in output makes it possible to purify a gas volume that is increased twofold or more in the same filter housings.

An increase in the ratio of the wall height to the distance between the walls to more than 1/1 leads to clogging of the honeycomb by captured product, whereas a reduction to less than 1/10 substantially reduces the increase in the layer thickness and the improvement of the absorption of harmful gaseous components because of the spontaneous cave-in of the layer, which is no longer supported by the walls of the honeycombs to the full extent.

The present invention can be used industrially because no special equipment and new technology is required for its preparation.

Figure 1:
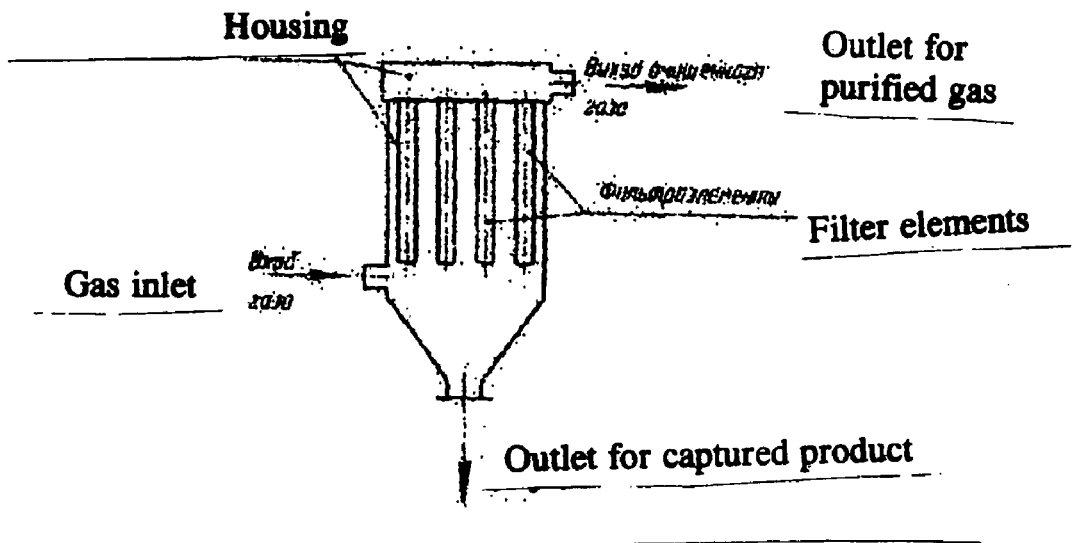
FIG. 1 shows a schematic diagram of the filter.
Figure 2:
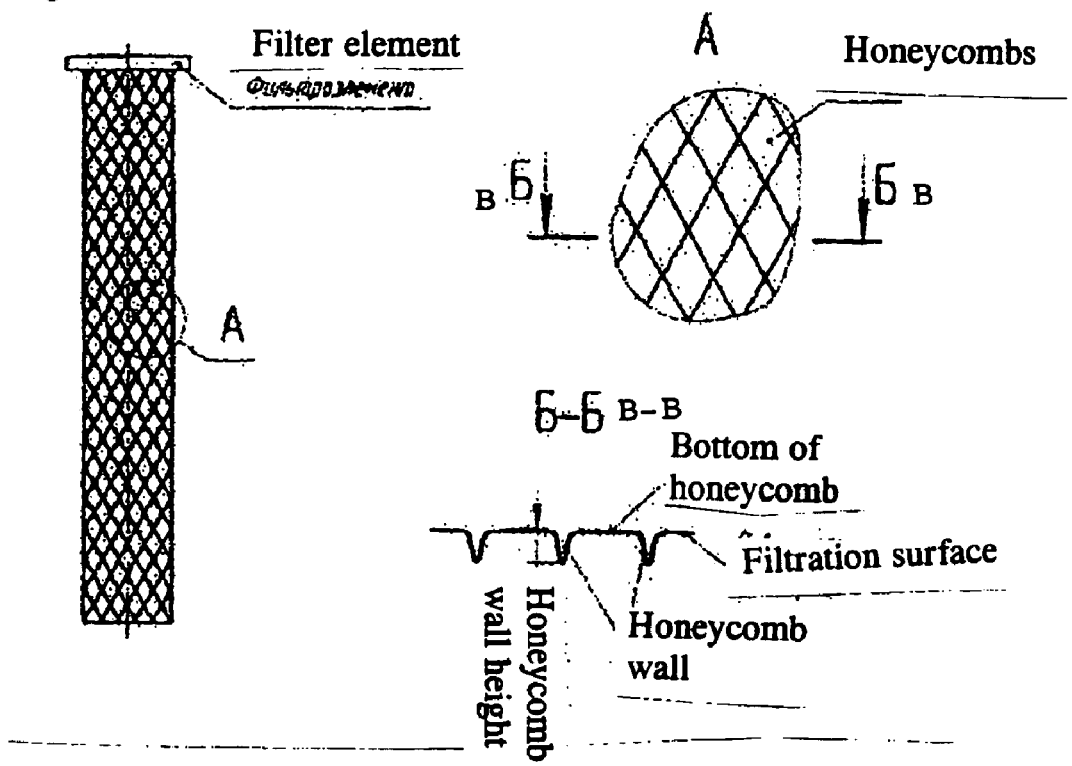
FIG. 2 shows the filter element with the filter material installed on it.

The construction of the "filter" device described in this specification and shown in FIG. 1 and FIG. 2 is not the only possible construction for achieving the technical result indicated above and does not rule out other variants of manufacture, which contain the combination of features included in the independent patent claim.

We claim:

1. Filter, comprising a housing, a gas inlet, an outlet for the purified gas and the captured product, and filtering elements, characterized in that a flat filter material is assembled in tetrangular superficial honeycombs and is installed on filter elements with the walls of the honeycomb facing the gas flow.

2. Filter in accordance with claim 1, characterized in that the ratio of the wall height of the honeycomb to the distance between the parallel walls of the honeycomb is in the range of 1/1 to 1/10 at a wall height of up to 40 mm.

3. Filter element having a filtering surface comprising a flat filter material assembled to define a plurality of straight protruding parts, where the protruding parts are characterized by a plurality of tetrangular superficial honeycombs.

* * * * *